Feb. 4, 1936.  J. O. HEINZE  2,029,717

BEARING

Filed Nov. 2, 1933

INVENTOR
John O. Heinze,
BY
ATTORNEYS

Patented Feb. 4, 1936

2,029,717

UNITED STATES PATENT OFFICE 2,029,717

BEARING

John O. Heinze, Detroit, Mich., assignor, by direct and mesne assignments, to Heinze Development Company, a corporation of Michigan Application November 2, 1933, Serial No. 696,361

1 Claim. (Cl. 308—203)

This invention relates to an anti-friction bearing structure, and more particularly to such a bearing for supporting a load member of large diameter, and particularly where such load member is to rotate at high speeds. Because of such large diameter and high speed, a roller or ball bearing of any known construction can not be used because of the high speed of rotation imparted to the balls or rolls of such a bearing, by contact thereof with surfaces carried by the parts between which the bearing is interposed, such speed of rotation creating excessive friction and high heat which soon causes what is known as "freezing", rendering the bearing inoperative.

The object of the present invention is to overcome these defects in a bearing of this character for this purpose, and to provide certain other new and useful features in the construction, arrangement and combination of parts, all as hereinafter set forth and more particularly pointed out in the appended claim, reference being had to the accompanying drawing wherein;

Figure 1:
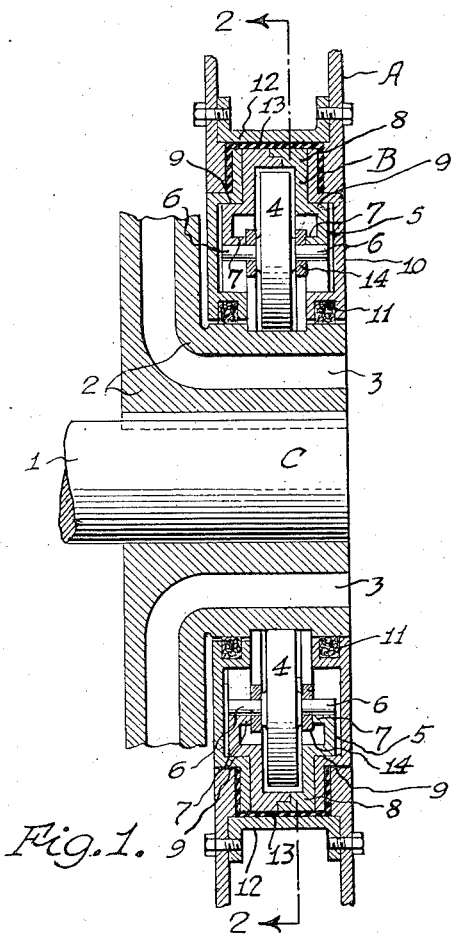
Figure 1 is a vertical axial section substantially upon the line 1—1 of Fig. 2, through a bearing illustrative of an embodiment of the present invention and showing, in section, a support in which the bearing is mounted, and a journal or load member supported by said bearing.
Figure 2:
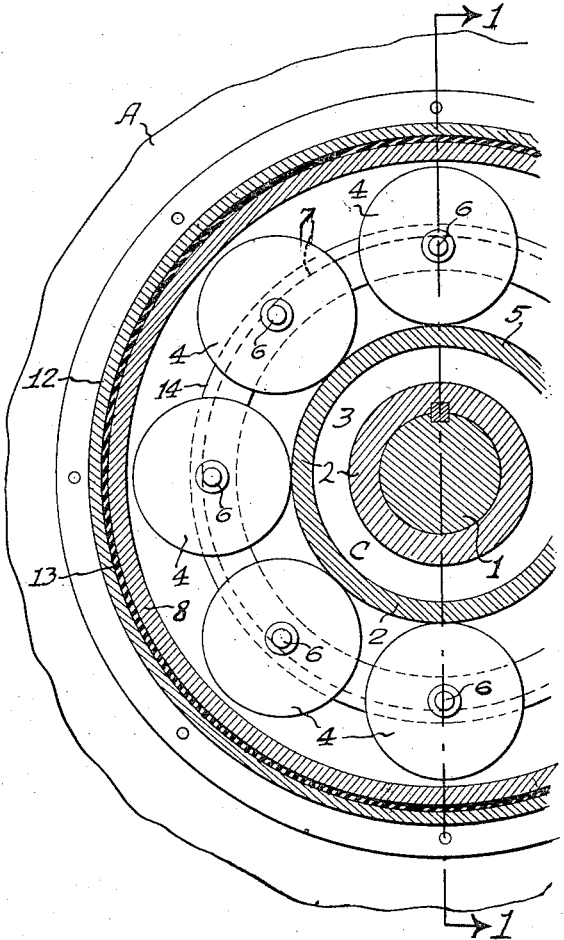
Fig. 2 is a sectional detail, substantially upon the line 2—2 of Fig. 1.

Where an anti-friction journal bearing or the like, must necessarily be of large diameter due to the large diameter of the load member or journal carried thereby, and more particularly where such member is driven at high speeds, ball or roller bearings of any known construction can not be employed because of the friction set up between contacting surfaces, and to avoid such friction by providing a rolling contact between such surfaces and at a speed of rotation which is not excessive even at high speeds of the load member or journal, a construction is illustrated in Figs. 1 and 2 of the accompanying drawing, wherein A indicates as a whole, a suitable supporting structure upon which the anti-friction bearing, indicated as a whole by the letter B, is mounted for supporting a rotatable load member or what may be termed a journal which is indicated as a whole by the letter C.

As illustrated, the load member or journal C comprises a drive shaft 1 to which is keyed or otherwise secured a hub 2, which hub, by reason of the diameter of said shaft and because said hub is formed with a longitudinal passage or passages 3 extending therethrough, must be of large diameter, such passages being desirable in certain constructions for certain purposes. Therefore the anti-friction bearing B for supporting this hub, must be of large diameter, and where this hub or journal is rotated at very high speeds which, in some instances may be as high as 10,000 R. P. M., it preferably includes a series of wheels 4 of large diameter as compared to the diameter of the balls or rollers commonly employed in bearings of the ordinary construction, these wheels being arranged to travel upon the peripheral surface of said hub and are preferably enclosed within a ring shaped cage 5, with these wheels carried by said cage, to contact or travel upon the hub surface at one side and to turn free of the cage at their diametrically opposite or outer side. These wheels are carried by or supported within the cage, by providing each wheel with an axial shaft or pintle 6, preferably projecting laterally from each side of each wheel to travel upon annular tracks 7 formed integral with or secured to said cage at each side of the series of wheels, and therefore the pintles of small diameter turning at the same speed as the wheels are turned in rolling upon the surface of the journal, will advance along the tracks slowly and the series of wheels will be carried around the journal in the direction of rotation of the journal, at a greatly reduced speed due to the pintles of small diameter rolling along the very large circle defined by said tracks.

If the arrangement was such that each of the several wheels contacted the support at a point diametrically opposite its point of contact with the journal, then the series of wheels would of necessity travel around the journal in contact with the fixed support, at high speed; but, by providing each wheel with a part of small diameter to travel upon a support of large diameter, a differential between the speed of travel of said wheels about the surface of the journal, and the speed of travel of the small diameter parts of these wheels along such fixed support, is secured, and said wheels may roll freely upon said journal, thus eliminating friction. In other words, through the arrangement whereby said wheels are provided with surfaces of different diameters to roll in contact with the surfaces between which said wheels are interposed, the speed of travel of one wheel surface along the surface contacted thereby, is reduced below the travel of the other wheel surface along the surface contacted by it.

The annular cage 5 of the bearing B, may be formed of mating annular members 8 meeting at their peripheries over and spaced from the outer sides of the peripheries of the series of wheels 4 with the inner peripheral edges of these members formed to provide the annular tracks 7 against which the wheel pintles 6 travel, there being one track at each side of said series of wheels to engage the pintles of all of the wheels projecting laterally therefrom, each of these inner annular members being formed to provide an annular shoulder 9, outwardly from and extending inwardly over each track 7, and to form a tight casing, outer annular side plates 10 are formed with annular shoulders to fit closely over the shoulders 9, and these plates extend inwardly toward the axis of the bearing with their inner edges formed with grooves to receive packing rings 11 adapted to engage the outer surface of the hub 2 at each side of the line of travel of the several wheels in contact with said surface and exclude dust and dirt from the interior of the bearing. The outwardly projecting portion of the cage beyond the shoulders 9 is adapted to be received within a suitable channel 12 formed in any manner upon the supporting structure 1 to firmly mount the bearing upon or within said structure, there preferably being a layer or wall 13 of rubber or other suitable resilient material interposed between the walls of said channel and the exterior of the cage projecting into this channel, to provide a slight yielding movement between said cage and its mounting to stop the transmission to said mounting of any vibration that might be set up by the rapid rotation of said hub or journal and to permit said bearing to find its center of rotation relative to the axis of said hub.

To hold the several wheels 4 accurately spaced apart around the bearing axis, a pair of spacer rings 14 is provided, each ring being formed with openings to receive the several wheel pintles 6 and to lie between the sides of the wheels and the adjacent sides of the tracks 7, the several wheels being thus held in proper annular spaced relation to engage the hub or journal surface at properly spaced apart points.

Figure 3:
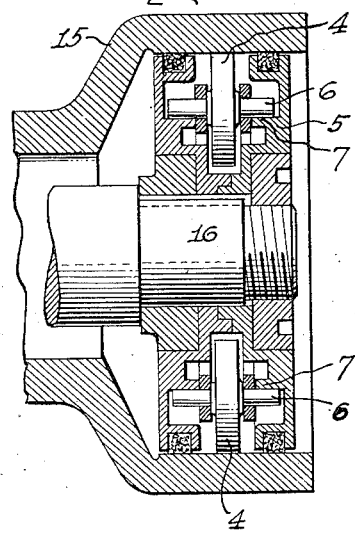
Fig. 3 is a modified construction wherein the support is internal and the rotatively supported part or member is external.

Obviously the same principle of construction may be embodied in a bearing for supporting an outer rotatable member 15 upon an inner fixed or stationary support 16 as shown in Fig. 3, the several wheels 4 in this construction, being arranged within the bearing cage 5 to travel upon the inner surface of said outer member 15 with their pintles 6 running upon the tracks 7 on the cage, said cage being secured in any suitable manner upon the non-rotatable inner member 16 which, as shown, is a shaft of large diameter.

It is also obvious that the construction of the bearing cage, and the construction of the inner rotatable hub and shaft forming the journal, as shown in Figs. 1 and 2, may be modified to suit the conditions of installation of the bearing, said hub being shown with longitudinal openings therethrough for the purpose of illustrating the necessity in certain cases, for a bearing of large diameter.

Where a bearing of such large diameter is used to support a journal which is driven at a very high speed, the advantages derived by providing a bearing embodying a construction wherein main bearing members having surfaces of different diameter to roll in contact with surfaces of different diameters on other parts as disclosed, is obvious, and any construction or modification embodying such arrangement, is contemplated as falling within the scope of the appended claim.

Having thus fully described my invention, what I claim is:—

An anti-friction bearing for interposition between a journal and a supporting structure provided with an inwardly open channel, said bearing comprising a series of wheels to roll in contact with said journal and having axial pintles extending from opposite sides thereof, an annular cage comprising mating inner members meeting at their peripheries over and spaced from the outer sides of the peripheries of said series of wheels and offset laterally to form annular shoulders with the portion of said cage outwardly of said shoulders projecting into said open channel of said supporting structure and formed at their inner edges with annular tracks at opposite sides of and extending toward said wheels and against which tracks said pintles travel, outer annular side plates engaging the outer sides of said mating inner members and with their inner peripheral edges adjacent the surface of said journal and each formed with an annular shoulder to engage over said annular shoulders on the mating inner members of said cage and with outwardly projecting peripheral portions to project into said channel of the supporting structure between the sides of said channel and the sides of the said annular portion of said mating members of said cage within said channel, and a layer of yieldable material within said channel of said supporting structure between the surfaces thereof and the surfaces of the portions of said cage and plates which project into said channel.

JOHN O. HEINZE.